(12) United States Patent
Parker, Jr. et al.

(10) Patent No.: US 10,472,169 B1
(45) Date of Patent: Nov. 12, 2019

(54) CONTAINER HAVING GATE VALVE

(71) Applicant: Perimeter Solutions LP, Clayton, MO (US)

(72) Inventors: Frank H. Parker, Jr., Granite City, IL (US); Robert J. Dodson, Jr., Webster Groves, MO (US); Darrell Clark Fee, Chesterfield, MO (US); Mark Willmore, Edwardsville, IL (US); Eric Linder, Jerseyville, IL (US); Brett Klaas, Batchtown, IL (US); Nick Williams, Edwardsville, IL (US)

(73) Assignee: Perimeter Solutions LP, Clayton, MO (US)

( * ) Notice: Subject to any disclaimer, the term of this patent is extended or adjusted under 35 U.S.C. 154(b) by 0 days.

(21) Appl. No.: 16/213,721

(22) Filed: Dec. 7, 2018

Related U.S. Application Data

(60) Provisional application No. 62/751,371, filed on Oct. 26, 2018.

(51) Int. Cl.
  *F16K 3/02* (2006.01)
  *B65D 90/58* (2006.01)
  *F16K 31/50* (2006.01)

(52) U.S. Cl.
  CPC .......... *B65D 90/587* (2013.01); *F16K 3/0254* (2013.01); *F16K 31/508* (2013.01)

(58) Field of Classification Search
  CPC ... B65D 90/587; F16K 31/508; F16K 3/0254; F16K 31/50; F16K 31/506; F16K 3/0281; F16K 1/50; F16K 3/3165
  USPC .......................... 251/229, 265–267, 326–329
  See application file for complete search history.

(56) References Cited

U.S. PATENT DOCUMENTS

| | | | | |
|---|---|---|---|---|
| 2,670,172 A | * | 2/1954 | Moore | F16K 31/508 251/266 |
| 3,349,789 A | * | 10/1967 | Crain | F16K 3/184 137/246.22 |
| 3,976,279 A | * | 8/1976 | Walker | F16K 31/508 251/267 |
| 4,703,915 A | | 11/1987 | King | |
| 5,007,120 A | | 4/1991 | Vogt et al. | |
| 5,338,006 A | | 8/1994 | McCutcheon et al. | |
| 5,560,587 A | | 10/1996 | McCutcheon et al. | |
| 5,653,423 A | | 8/1997 | Young et al. | |
| 5,979,874 A | | 11/1999 | Gambetta et al. | |
| 5,983,743 A | * | 11/1999 | McGregor | F16D 27/105 251/129.13 |

(Continued)

OTHER PUBLICATIONS

Two images of non-rising stem valve drive components in commercial use in phosphorous pentasulfide containers at least as early as Dec. 31, 2014. Admitted prior art.

(Continued)

*Primary Examiner* — John Bastianelli
(74) *Attorney, Agent, or Firm* — Stinson LLP

(57) ABSTRACT

A valve and associated components and methods, and a container including such a valve. The valve may be referred to as a non-rising stem gate valve. The valve includes a gate movable by a drive assembly to open and close the valve. The drive assembly includes a thrust bearing assembly configured to resist damage due to thrust force. The thrust bearing assembly can include a race threaded to a drive shaft of the drive assembly. The race can be pinned to the drive shaft by a roll pin.

20 Claims, 15 Drawing Sheets

(56) References Cited

U.S. PATENT DOCUMENTS

| | | | | |
|---|---|---|---|---|
| 7,523,916 B2* | 4/2009 | Fenton | ................... | F16K 3/0254 |
| | | | | 251/266 |
| 8,690,121 B2* | 4/2014 | Olvera | ................ | F16K 31/5286 |
| | | | | 251/265 |
| 9,145,979 B2* | 9/2015 | Hoang | ................... | F16K 3/0254 |
| 9,500,294 B2* | 11/2016 | Herman | ................ | F16K 31/122 |

OTHER PUBLICATIONS

Letter dated Apr. 8, 2019 regarding Experimental Use beginning Nov. 30, 2016, 10 pages.

* cited by examiner

FIG. 7
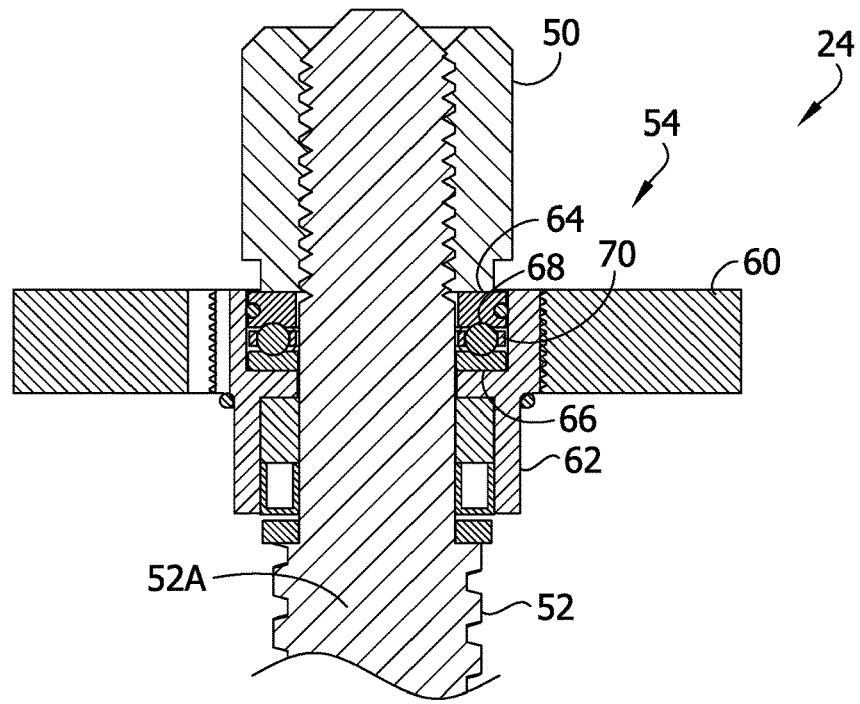
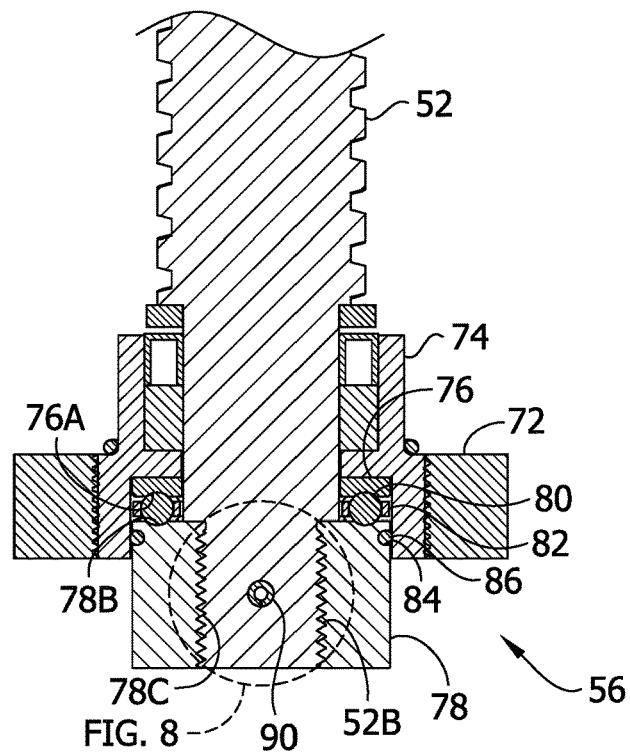

US 10,472,169 B1

CONTAINER HAVING GATE VALVE

FIELD

The present disclosure generally relates to valves, and more particularly to a valve for opening and closing a flow passageway such as a port of a container.

BACKGROUND

A container or bin for storing phosphorous pentasulfide commonly includes a valve for opening and closing a fill/dispense port of the bin. This type of bin is often re-used many times to deliver multiple loads of phosphorous pentasulfide to the same or various customers. The valve is opened at the supplier to install phosphorous pentasulfide in the bin. After the valve is closed, the bin is delivered to the customer. The customer opens the valve to dispense the phosphorous pentasulfide as desired. If possible, the customer closes the valve, and returns the bin empty to the supplier. The bins and their valves are subject to harsh conditions due to the nature of the phosphorous pentasulfide, fluctuations in weather, and rough treatment by some personnel opening and closing the valves. Conventional valves do not last long in the field before requiring maintenance and/or repair. Phosphorous pentasulfide is generally hazardous and should be well contained. Valve malfunction and valve maintenance can subject workers to undesired exposure to phosphorous pentasulfide. Moreover, ingress of moisture through the valve is undesirable because phosphorous pentasulfide reacts with water to form hydrogen sulfide, sulfur dioxide, and phosphoric acid.

SUMMARY

In one aspect, a non-rising stem gate valve comprises a valve housing and a valve port for passage of material through the valve housing. A gate is supported by the valve housing and movable with respect to the valve port. The gate is movable to a closed position with respect to the valve port for closing the valve port and movable to an open position with respect to the valve port for opening the valve port. The gate includes a follower for driving movement of the gate. A drive assembly is configured to move the gate to open and close the valve port. The drive assembly includes a drive shaft and at least one bearing assembly. The bearing assembly supports the drive shaft for rotation about an axis of rotation. The drive shaft includes a first threaded section in threaded engagement with the follower for moving the gate between the open and closed positions by rotation of the drive shaft about the axis of rotation. The bearing assembly includes first and second races and a plurality of ball bearings between the first and second races. The first race comprises a race track on which the plurality of ball bearings roll when the drive shaft is rotated about the axis of rotation. The first race includes a race track support body. The race track support body is configured to support the race track against a thrust force in a thrust direction generally parallel with the axis of rotation. The drive shaft includes a second threaded section in threaded engagement with the race track support body for resisting movement of the race track support body with respect to the drive shaft in the thrust direction.

Other objects and features of the present disclosure will be in part apparent and in part pointed out herein.

BRIEF DESCRIPTION OF THE DRAWINGS

FIG. 7 is a section of the drive assembly taken in a plane including line 7-7 of FIG. 6;

Corresponding reference characters indicate corresponding parts throughout the drawings.

DETAILED DESCRIPTION

Figure 1:
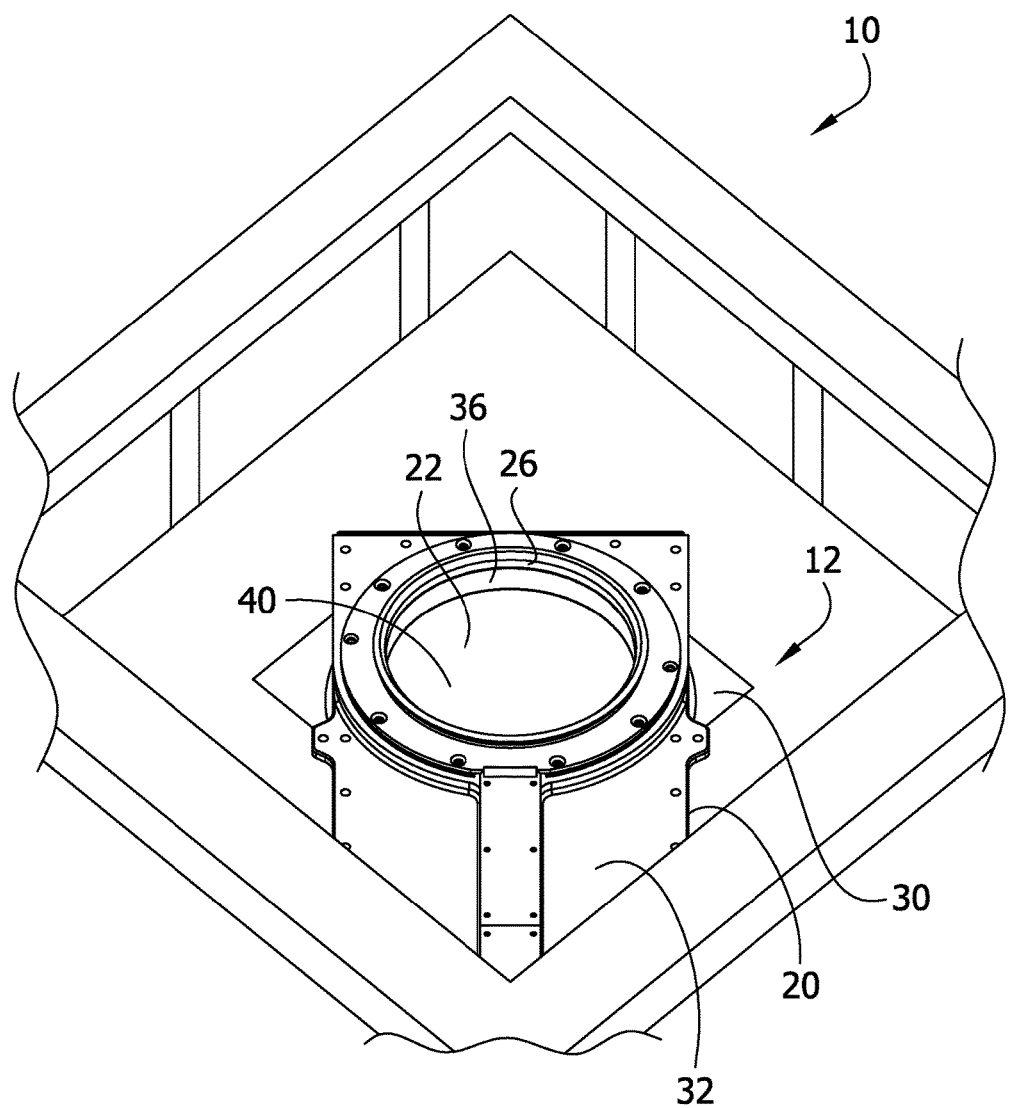
FIG. 1 is a top, front fragmentary perspective of a container embodying aspects of the present invention, the container including a valve shown in a closed configuration.

Referring to FIG. 1, a bin or container 10 embodying aspects of the present invention can include a non-rising stem gate valve (broadly, "valve" or "gate valve") indicated generally by the reference number 12. The bin 10 can be used for storing and/or transporting various materials, such as solids or liquids. In one example, the bin 10 can be used to hold an oil additive known as phosphorous pentasulfide, a crystalline solid powder. It will be appreciated that the bin 10 could be used for other purposes (e.g., carrying other materials). Moreover, the valve 12 could be used on other apparatus, and aspects of the valve could be used in other types of valves, without departing from the scope of the present invention.

Figure 2:
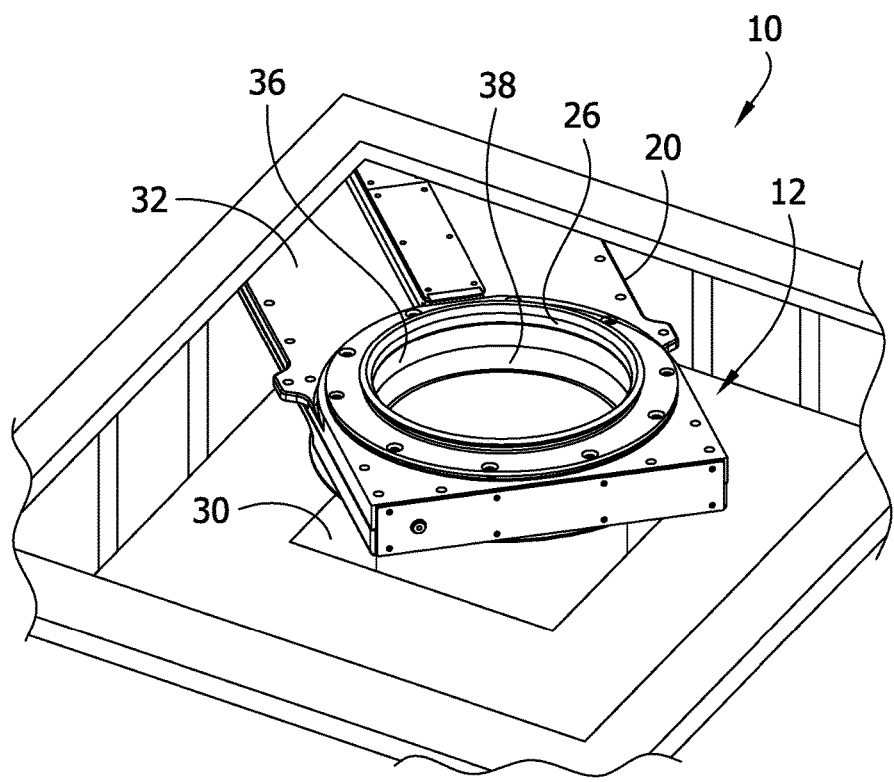
FIG. 2 is a top, rear fragmentary perspective of the container of FIG. 1, showing the valve in an open configuration.
Figure 3:
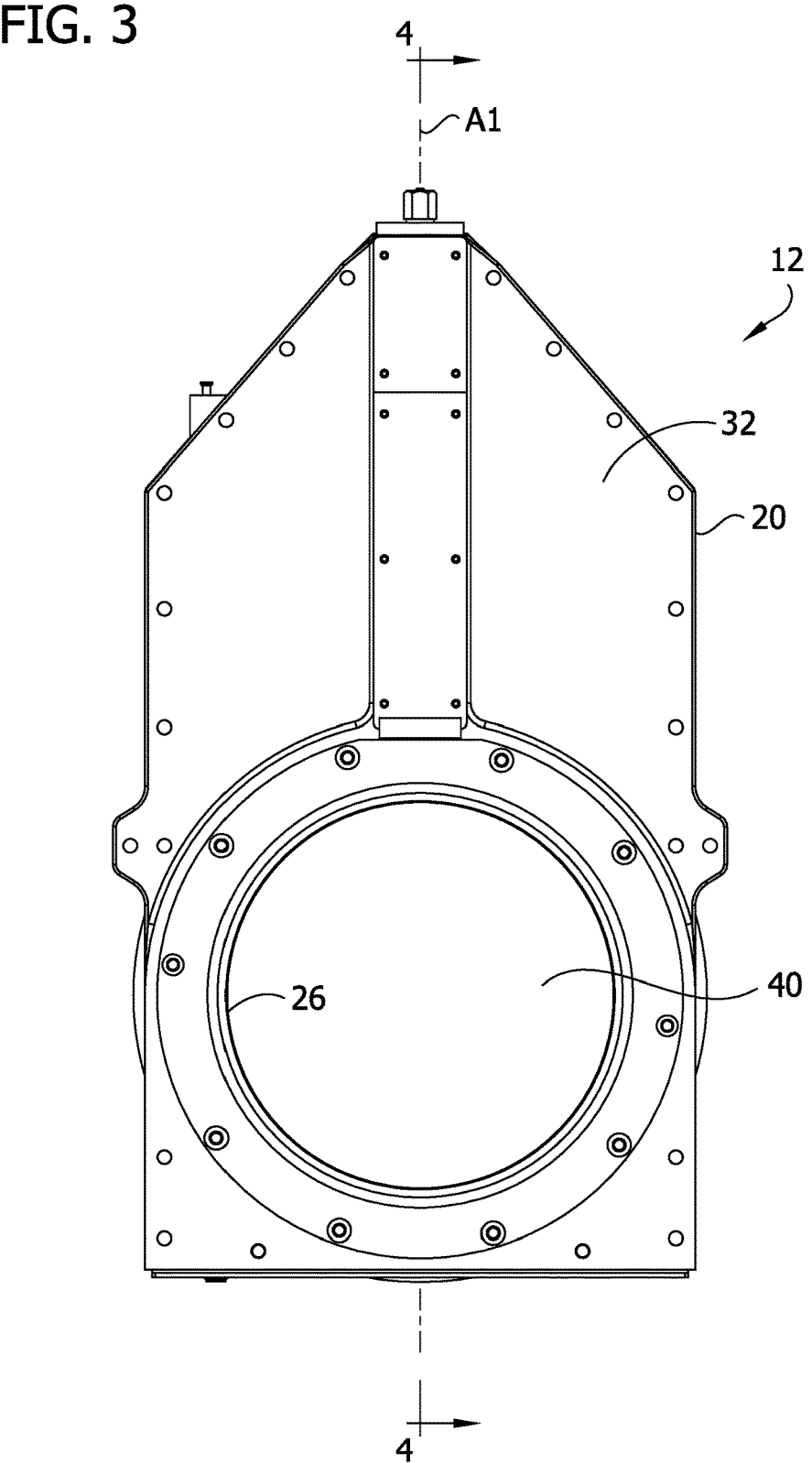
FIG. 3 is a front elevation of the valve.
Figure 5:
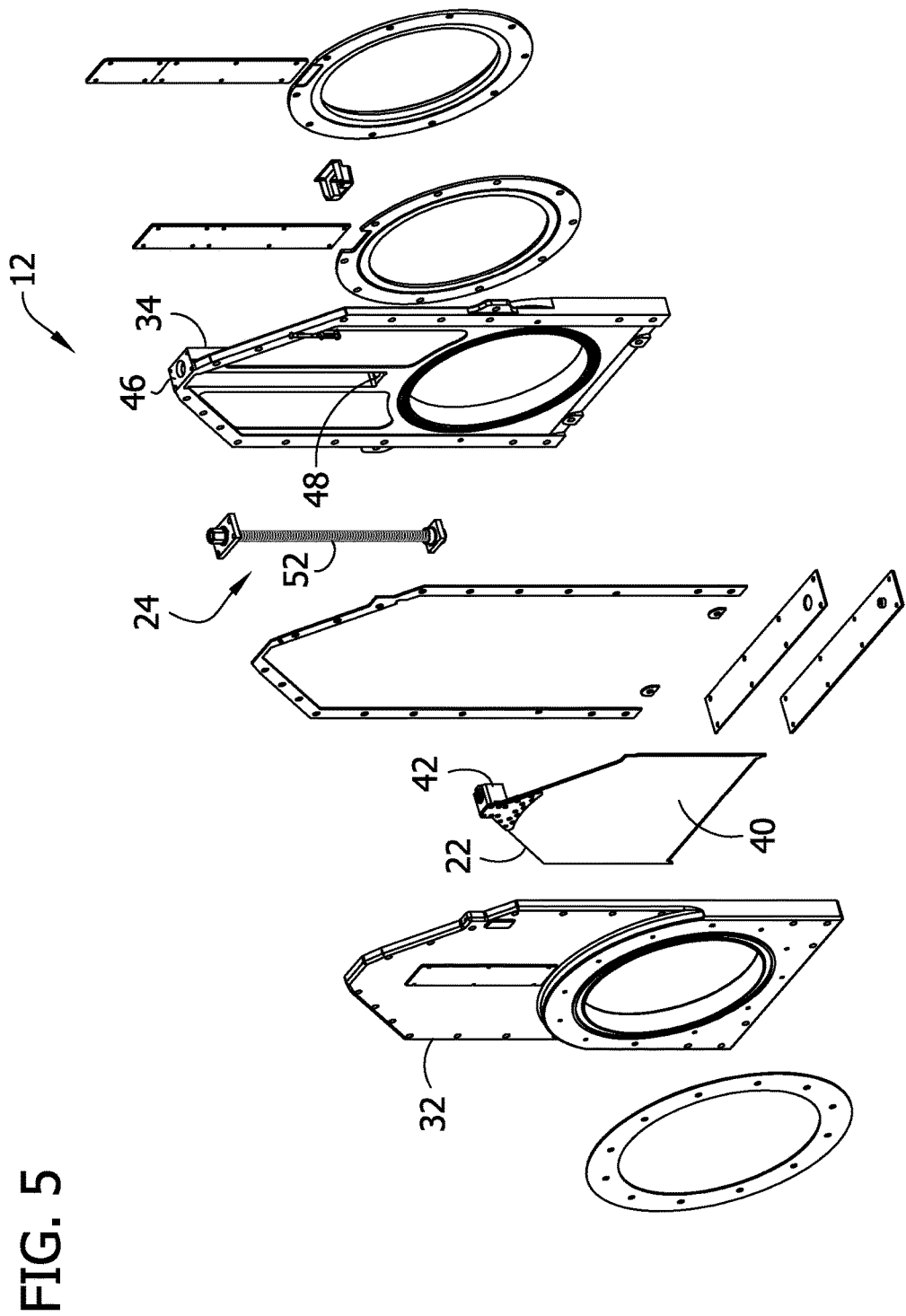
FIG. 5 is an exploded view of the valve.

The valve 12 is shown in a closed configuration in FIG. 1 and in an open configuration in FIG. 2. An exploded view of the valve 12 is shown in FIG. 5. The valve generally includes a valve housing 20, a gate 22 movable in the valve housing, and a drive assembly 24 for moving the gate in the valve housing between closed and open positions. The valve housing 20 defines a generally circular valve port 26 through which phosphorous pentasulfide can be installed into the bin 10 and/or dispensed from the bin. For example, the bin can be oriented such that the port 26 faces upward for filling the bin 10, and the bin can be oriented such that the port faces to the side or downward for emptying the bin. In FIGS. 1 and 2, the port 26 is facing upward for filling the bin 10. The valve housing 20 is connected to a neck of the bin leading to a body 30 of the container defining an interior in which product can be stored. The valve port 26 provides access to the interior of the bin.

In the illustrated embodiment, the valve housing 20 includes an outer shell 32 and an inner shell 34. The outer and inner shells 32, 34 can be made of cast and/or machined aluminum. The shells 32, 34 have respective circular openings that form the valve port 26 when the shells are secured to each other. Desirably, sealing rings 36, 38 are mounted on the inner and outer shells 32, 34 to surround the circular openings and to seal against each other when the shells are secured to each other to form a seal around the valve port 26 to prevent ingress of phosphorous pentasulfide or water into the valve housing 20 between the shells. When the gate 22 is in the closed position, the gate closes the valve port and extends between the sealing rings 36, 38. The drive assembly 24 is configured to slide the gate 22 between the sealing rings 36, 38 to open and close the valve port 26.

Figure 4:
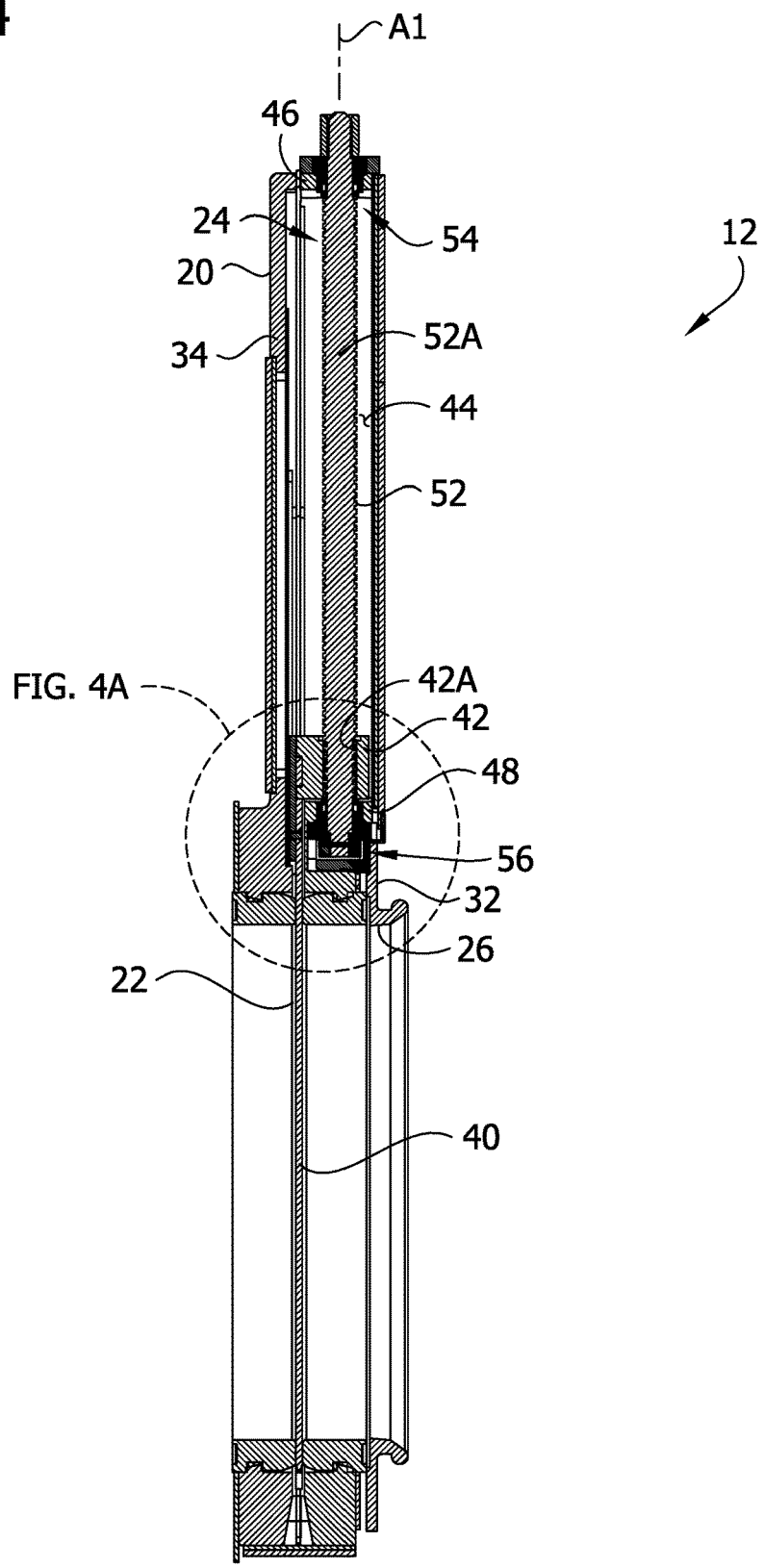
FIG. 4 is a section of the valve taken in a plane including line 4-4 of FIG. 3.
Figure 4A:
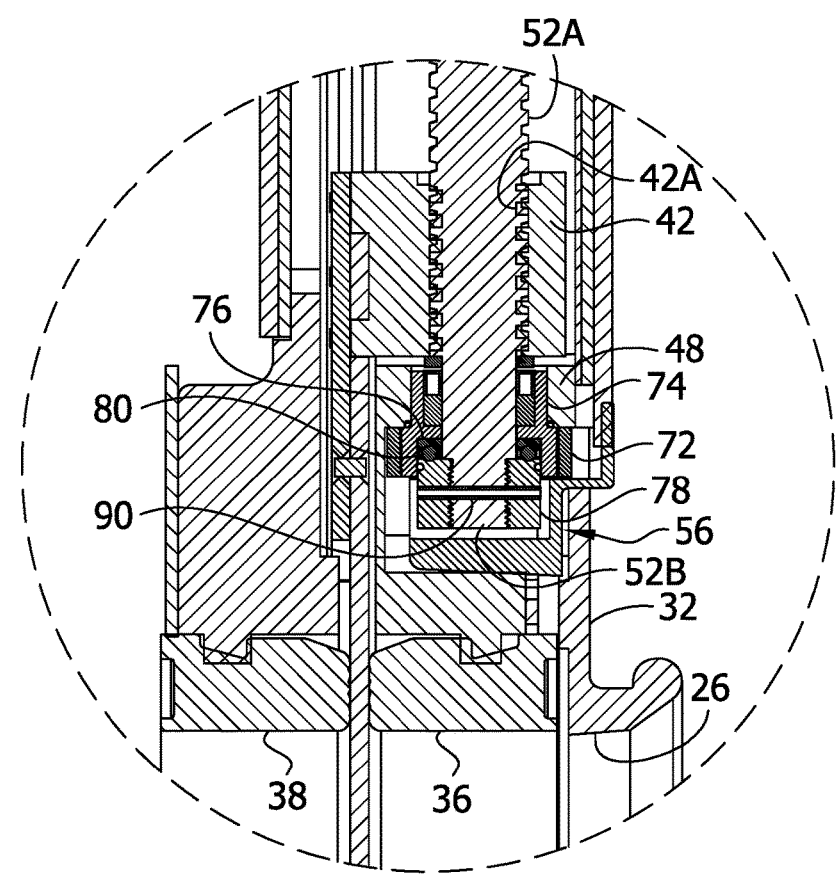
FIG. 4A is an enlarged view of a portion of FIG. 4.

As shown in FIGS. 4 and 5, the gate 22 includes a generally flat gate body 40 and a follower 42. The gate body 40 is sized and shaped to slide between the sealing rings 36, 38 and to close the valve port 26 when the gate 22 is in the closed configuration. The follower 42 is secured to an upper end of the gate body 40 and includes a threaded opening 42A for threaded connection to the drive assembly 24, as will become apparent.

As shown in FIG. 4, the valve housing 20 defines an elongate cavity 44 in which the drive assembly 24 is partially housed and in which the gate follower 42 is movable to open and close the valve port 26. The housing 20 includes an upper web 46 at an upper end of the elongate cavity and a lower web 48 at a lower end of the elongate cavity. The drive assembly 24 is mounted to, supported by, and extends between the upper and lower webs 46, 48 when the drive assembly is installed in the housing 20. The gate follower 42 engages the upper web 46 when the gate is fully raised (open) and engages the lower web 48 when the gate is fully lowered (closed), as shown in FIG. 4. The upper and lower webs 46, 48 can be broadly referred to as follower stops and bearing assembly supports.

Figure 6:
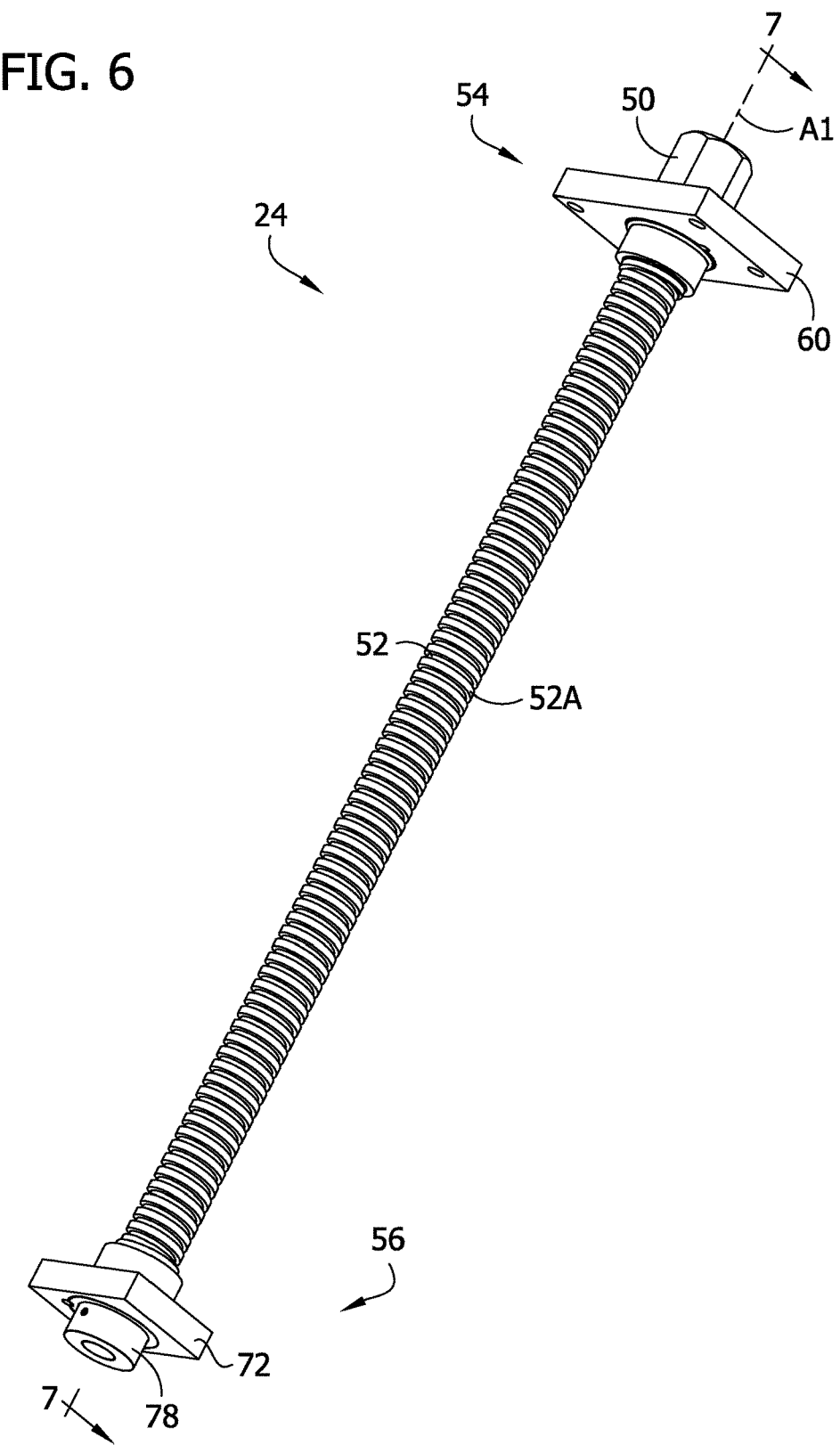
FIG. 6 is a perspective of a drive assembly of the valve.
Figure 8:
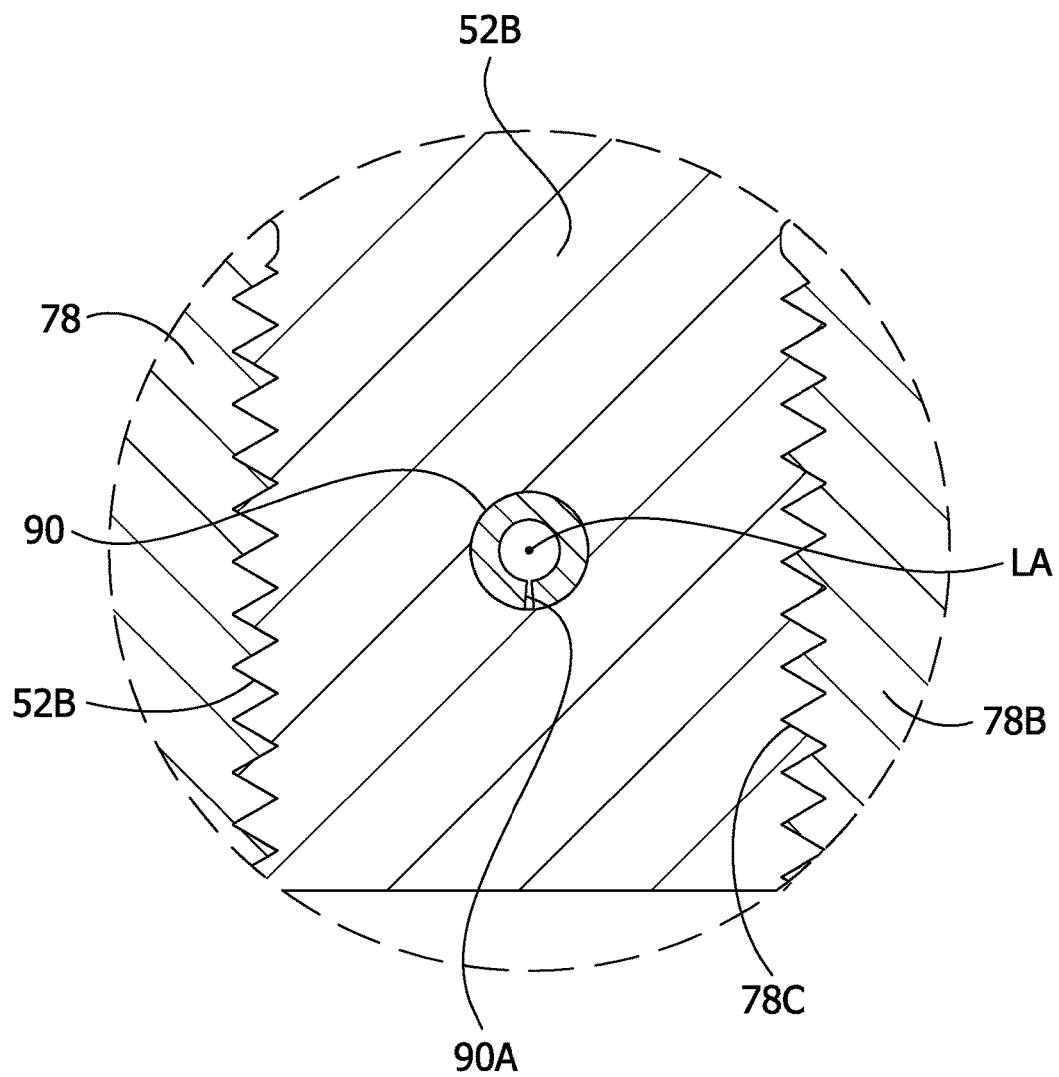
FIG. 8 is a partial view of the section of FIG. 7 showing a roll pin in closer detail.
Figure 9:
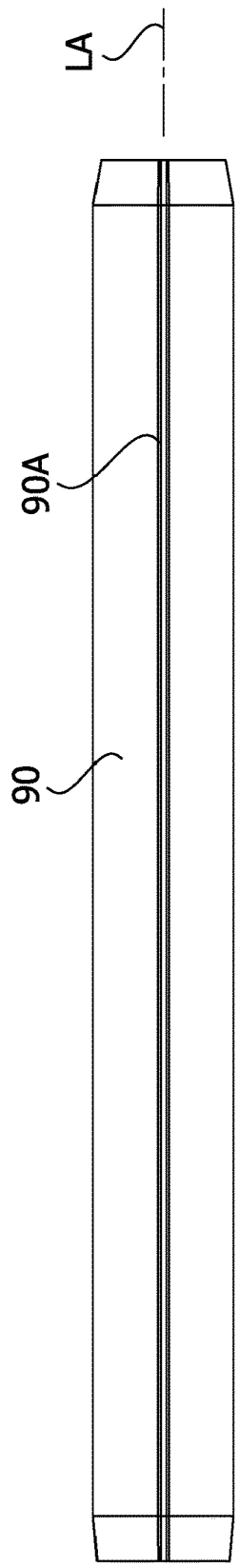
FIG. 9 is a side elevation of the roll pin.
Figure 10:
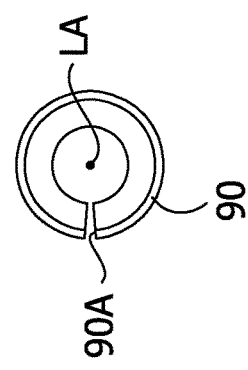
FIG. 10 is an end view of the roll pin.
Figure 11:
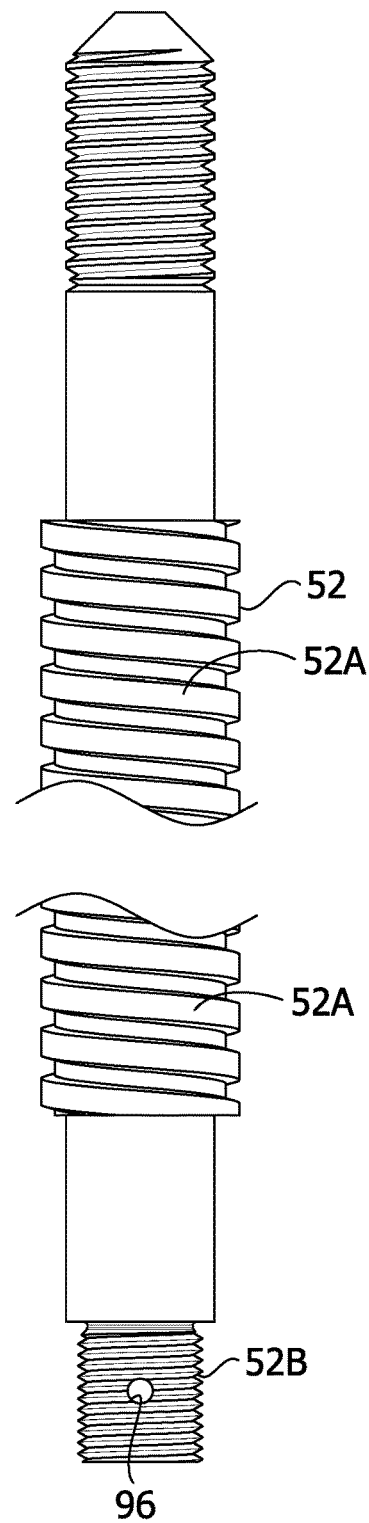
FIG. 11 is a side elevation of a drive shaft of the drive assembly.
Figure 12:
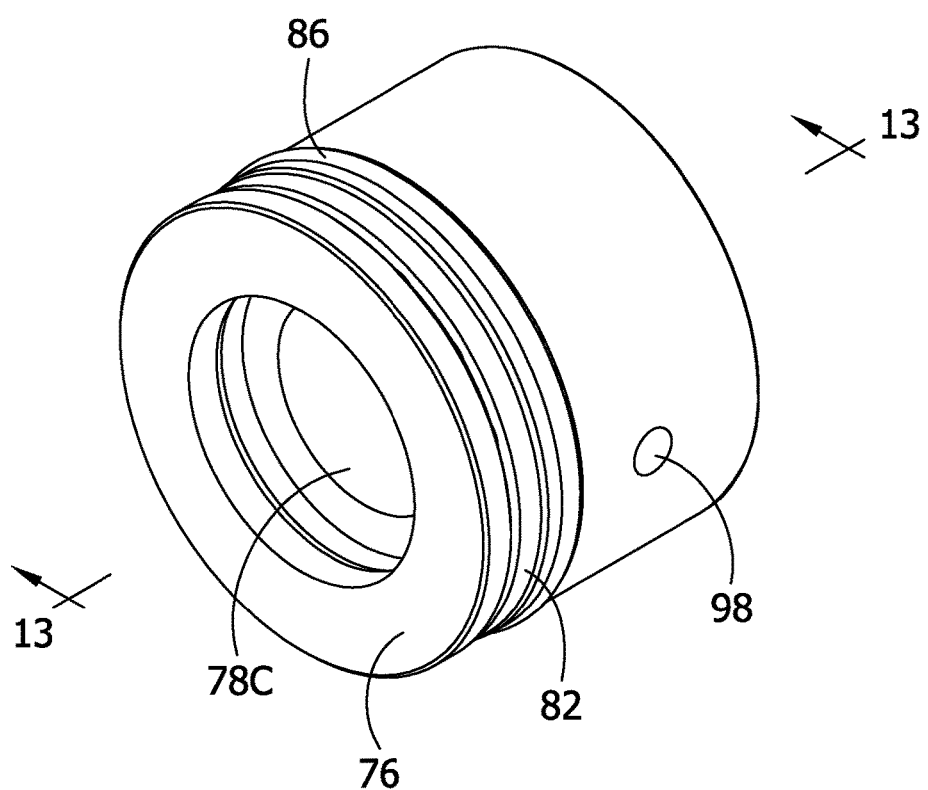
FIG. 12 is a perspective of a non-drive-end bearing assembly of the drive assembly.
Figure 13:
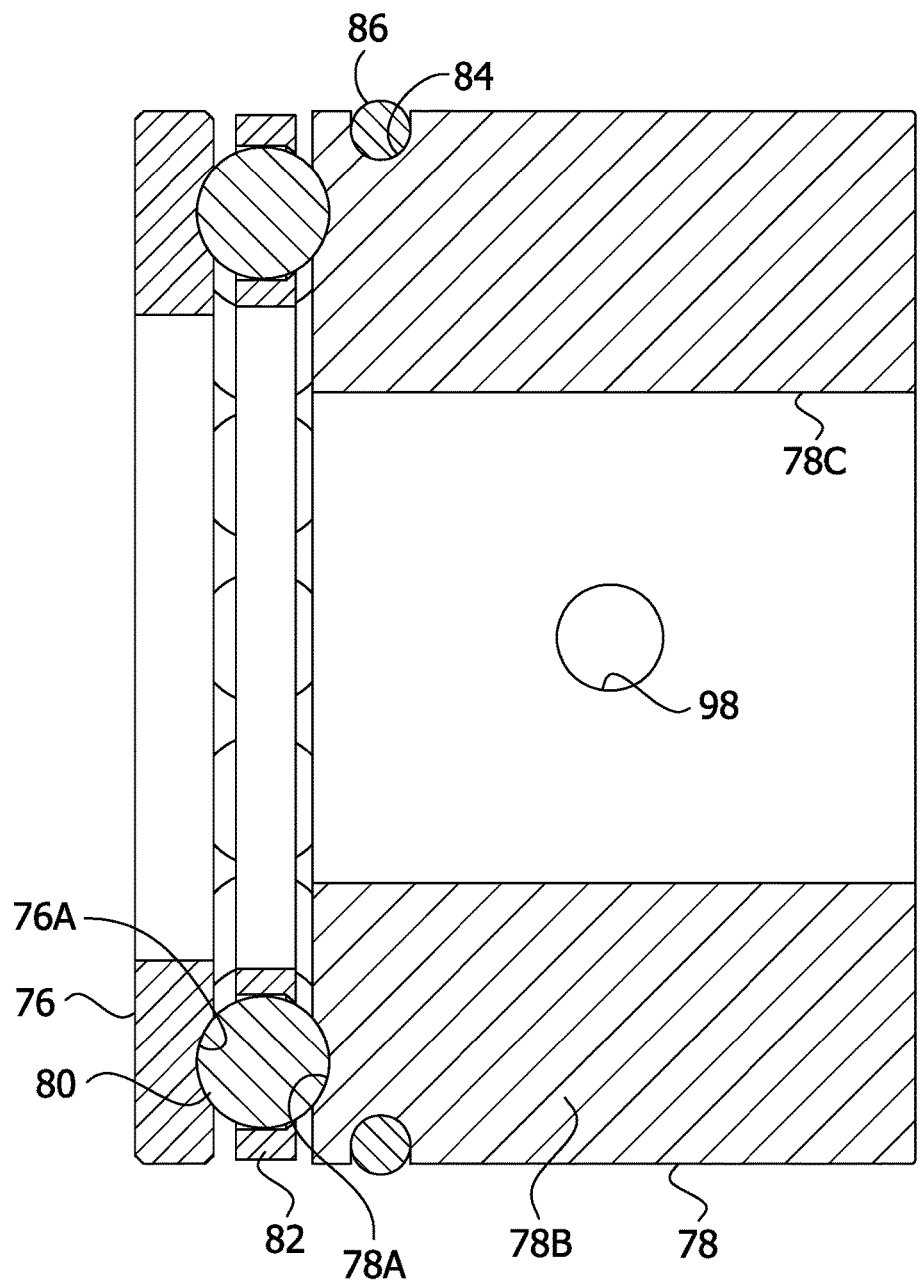
FIG. 13 is a section of the non-drive-end bearing assembly taken in a plane including line 13-13 of FIG. 12.
Figure 14:
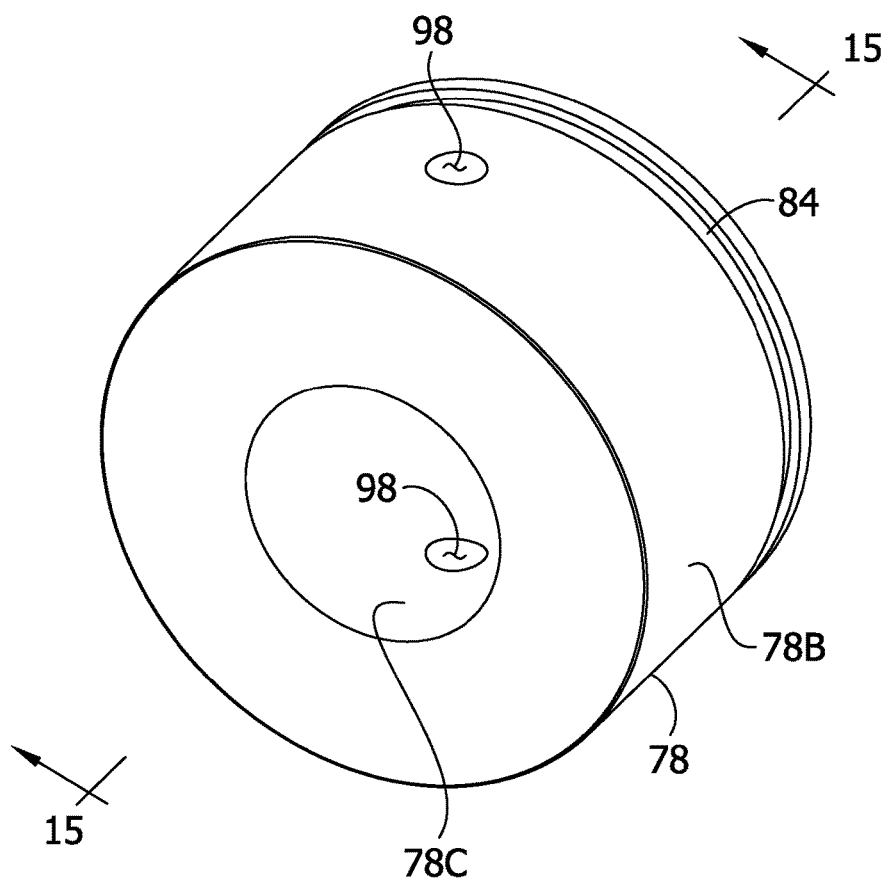
FIG. 14 is a perspective of a threaded bearing race of the bearing assembly of FIG. 12.

Referring to FIG. 6, the drive assembly 24 has a drive end (to the top as viewed in FIG. 6) and a non-drive end (to the bottom as viewed in FIG. 6). When the drive assembly 24 is installed in the housing 20, the drive end extends out of the housing and is exposed outside the housing for actuating the gate valve 12. In particular, a nut 50 threaded onto and welded to a top end of a drive shaft 52 is exposed outside the housing 20 for engagement by a nut setter or other tool. The drive shaft 52 is shown as a unitary component, but it will be understand separate shaft members could be connected together to form the drive shaft without departing from the scope of the present invention. The drive assembly 24 includes a drive-end thrust bearing assembly 54, and a non-drive-end thrust bearing assembly 56 that support respective ends of the drive shaft 52. The drive shaft 52 includes an intermediate portion 52A that has an ACME thread on which the gate follower 42 is threaded when the valve is assembled. The drive shaft 52 is rotatable about an axis of rotation A1 extending between the thrust bearing assemblies 54, 56. Rotation of the shaft 52 in a first direction (e.g., clockwise) drives the gate follower 42 downward (toward the port 16), and rotation of the shaft in a second direction (e.g., counter-clockwise) opposite the first direction drives the gate follower upward (away from the port).

Desirably, the gate valve 12 is configured such that the gate 22 is movable toward the open and closed positions by application of rotational force (e.g., to the drive shaft 52 via the top nut 50) of less than 60 ft-lbs, more desirably less than 50 foot-lbs, more desirably less than 40 ft-lbs, and even more desirably less than 30 ft-lbs (e.g., about 25 ft-lbs). In testing of a prototype of the illustrated valve 12, the rotational force required to move the gate was about 17 ft-lbs.

The drive-end thrust bearing assembly 54 includes an anti-rotation mount or plate 60, a bearing housing 62 threaded in the mount, an upper bearing race 64, a lower bearing race 66, a plurality of ball bearings 68 (e.g., 16 ball bearings), and a cage 70 separating the ball bearings from one another.

The non-drive-end thrust bearing assembly 56 includes an anti-rotation mount or plate 72, a bearing housing 74 threaded in the mount, an upper bearing race 76, a lower bearing race 78, a plurality of ball bearings 80 (e.g., 16 ball bearings), and a cage 82 separating the ball bearings from one another. The upper and lower races 76, 78 include respective annular race tracks 76A, 78A on which the ball bearings 80 roll around the axis of rotation. The lower race 78 includes a race track support body 78B configured to provide robust support to the race track 78A. In the illustrated embodiment, the lower race 78 is a unitary component in which the race track 78A and race track support body 78B are formed integrally of the same piece of material (e.g., by machining a blank of material). The race track 78A is defined by an annular surface on the upper end of the race track support body 78B. However, it will be appreciated that the race track 78A and race track support body 78B could be formed of separate pieces of material and movable (e.g., rotatable) with respect to each other without departing from the scope of the present invention. For example, the lower race could include a collar and a washer separate from the collar, the washer defining the race track, and the collar defining the race track support body.

In the illustrated embodiment, the ball bearings 80 and annular tracks are sized such that the ball bearings engage the annular tracks 76A, 76B along relatively large semicircular surface segments of the ball bearings. However, non-recessed race tracks can be used without departing from the scope of the present disclosure.

The lower bearing race 78 desirably has a seal with the bearing housing 74. In the illustrated embodiment, the race track support body 78B has an outer annular recess 84. The annular recess holds a gasket (e.g., O-ring) 86 for forming a seal with an inside of the bearing housing 74.

In a particularly advantageous aspect of the gate valve 12, the non-drive-end bearing assembly 56 is configured to withstand a potential mode of failure in which the gate valve is "dead headed" by closing the valve and continuing to rotate the drive shaft 52. For example, although not recommended, some users may actuate the drive assembly 24 by engaging an impact wrench (e.g., ¾" impact wrench carrying an appropriate socket) with the nut at the upper end of the drive assembly. The user may do this to overcome difficulty in closing the valve due to phosphorous pentasulfide powder blocking closure of the gate. Before the user realizes the valve 12 is fully closed, the user may continue to rotate the drive shaft 52 by applying high torque via the impact wrench. When the gate follower 42 is in engagement with the lower web 48, further rotation of the drive shaft 52 tending to drive the follower farther downward will cause the drive shaft to attempt to pull the lower bearing assembly 56 upward through the opening in the lower web 48. The result is application of substantial thrust force (force parallel to the axis of rotation) to the lower bearing assembly 56.

Figure 15:
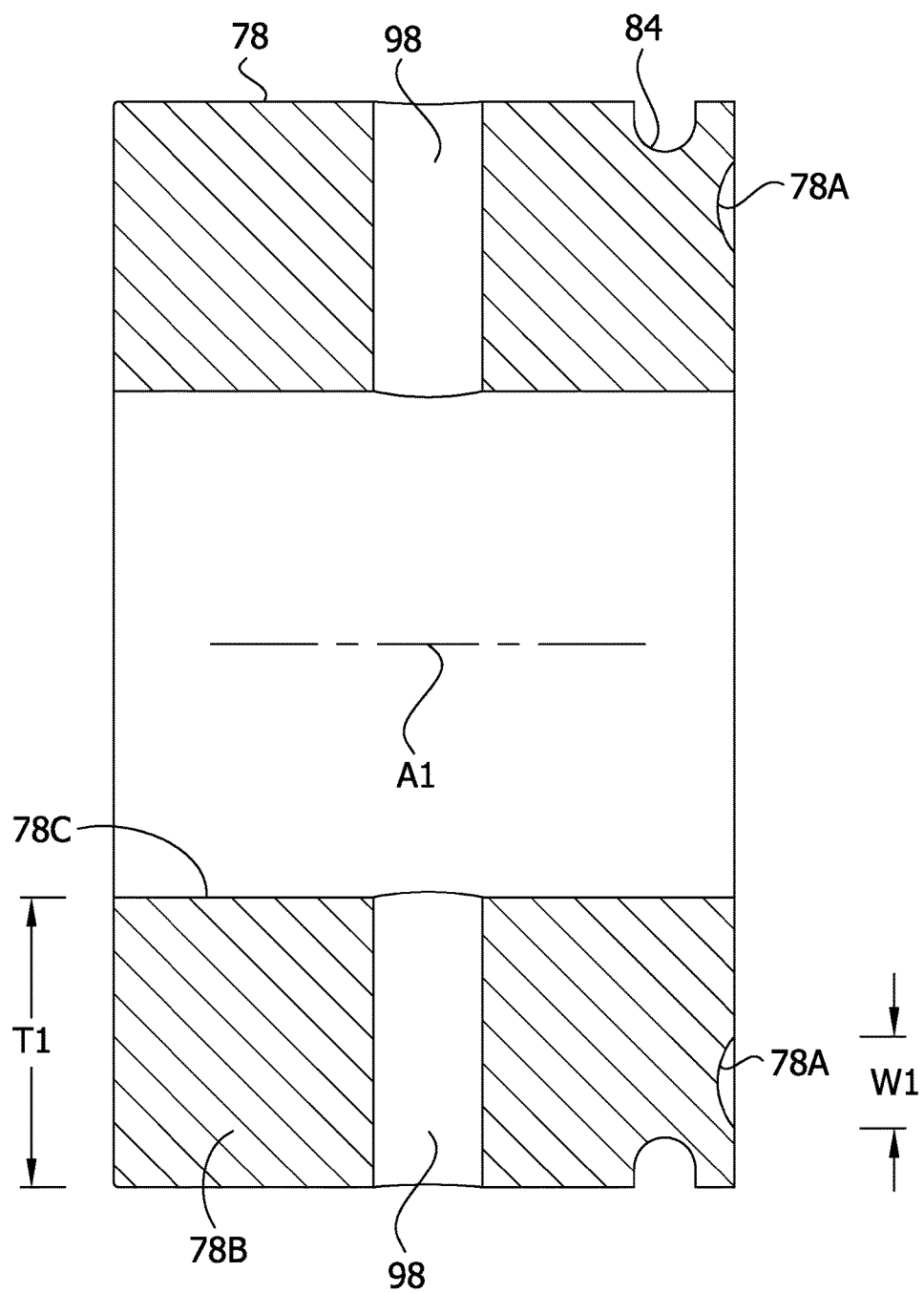
FIG. 15 is a section of the threaded bearing race taken in a plane including line 14-14 of FIG. 14.

To provide resistance to damage when the gate valve 12 is dead-headed, the lower race 78 of the non-drive-end bearing assembly 56 is threaded to the lower end of the drive shaft 52, is secured to the drive shaft by a roll pin 90 for conjoint rotation with the drive shaft, and has a relatively robust construction. Any one or more of these features, or combinations or variations thereof, can be used without departing from the scope of the present invention. The lower end of the drive shaft 52 has a suitably threaded portion 52B (e.g., ⅝"-18) (desirably, a coarse thread) and the lower race 78 has a corresponding threaded opening 78C. The threading of the lower race 78 to the drive shaft 52 provides substantial engagement surface area of the lower race with the drive shaft. This assists the lower race 78 in maintaining its position on the drive shaft 52 and transferring thrust force to the drive shaft over a relatively large surface area via the threaded engagement when the drive shaft is subjected to substantial thrust force tending to force the upper race 76 toward the lower race 78. The roll pin 90 extends through a transverse bore 96 in the drive shaft 52 and has ends extending in aligned opposite openings 98 in the lower race 78. The roll pin 90 prevents the lower race 78 from unthreading from the drive shaft 52 and assists in resisting thrust force applied to the lower race. Desirably, the roll pin 90 is installed such that an elongate gap 90A extending longitudinally in the wall of the roll pin and facing radially away from a longitudinal axis LA of the roll pin faces along or codirectional with the axis of rotation A1, not transverse to the axis of rotation, such that the gap does not tend to reduce by compression of the roll pin under the thrust forces. The lower race 78 has a particularly robust construction in that the race is relatively thick and tall, making the lower race less likely to crack or otherwise break when under substantial thrust force. The robustness of the race track support body 78B can be described by reference to a width W1 (FIG. 15) of the race track 78A extending radially with respect to the axis of rotation A1. The race track support body 78B as an intermediate section spaced along the axis A1 away from the race track 78A having a thickness T1 (FIG. 15) that is at least as great as the width W1 of the race track 78A. In the illustrated embodiment, the thickness T1 is greater than the width W1, and the thickness is such that an outer surface of the race track support body 78A extending around the axis A1 is radially outboard of the race track 78A. The thickness of the lower race 78 is carried downward from the upper surface of the race to the lower surface of the lower race. The construction of the lower race 78 and connection of the lower race increases the structural integrity of the bearing assembly 56 and renders the bearing assembly less likely to break when the valve is dead-headed.

Bins or containers including gate valves of the type described herein have been subjected to field testing and have been found to withstand harsh operating conditions. In particular, a previous point of failure was damage to components of the lower thrust bearing assembly when the user continued rotating the drive shaft tending to drive the gate further downward when the gate was bottomed out with the follower in engagement with the lower web of the housing. However, the construction of the lower thrust bearing described herein has been found to withstand substantial abuse without breaking. The lower race and connection of the lower race to the drive shaft is believed to result in a particularly robust construction that is able to withstand high thrust forces of "dead-heading" the gate valve. In testing, a lower race as shown and described herein remained undamaged after dead-heading the gate valve and applying torque up to 276 ft-lbs to the drive shaft via the nut 50. Prior bearings started exhibiting damage at less than 100 ft-lbs.

It will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A non-rising stem gate valve comprising:
   a valve housing;
   a valve port for passage of material through the valve housing;
   a gate supported by the valve housing and movable with respect to the valve port, the gate movable to a closed position with respect to the valve port for closing the valve port and movable to an open position with respect to the valve port for opening the valve port, the gate including a follower for driving movement of the gate;
   a drive assembly configured to move the gate to open and close the valve port, the drive assembly including a drive shaft and at least one bearing assembly, the bearing assembly supporting the drive shaft for rotation about an axis of rotation, the drive shaft including a first threaded section in threaded engagement with the follower for moving the gate between the open and closed positions by rotation of the drive shaft about the axis of rotation, the bearing assembly including first and second races and a plurality of ball bearings between the first and second races, the first race comprising a race track on which the plurality of ball bearings roll when the drive shaft is rotated about the axis of rotation, the first race including a race track support body, the race track support body configured to support the race track against a thrust force in a thrust direction generally parallel with the axis of rotation, the drive shaft including a second threaded section in threaded engagement with the race track support body for resisting movement of the race track support body with respect to the drive shaft in the thrust direction.

2. A non-rising stem gate valve as set forth in claim 1, wherein the first race comprises a unitary piece of material defining the race track and the race track support body.

3. A non-rising stem gate valve as set forth in claim 2, wherein the race track comprises an annular recess configured to at least partially receive the ball bearings.

4. A non-rising stem gate valve as set forth in claim 1, wherein the race track support body is secured to the drive shaft for conjoint rotation of the race track support body with the drive shaft about the axis of rotation.

5. A non-rising stem gate valve as set forth in claim 4, wherein the race track support body is pinned to the drive shaft by a roll pin.

6. A non-rising stem gate valve as set forth in claim 5, wherein the roll pin extends through a bore in the second threaded section of the drive shaft.

7. A non-rising stem gate valve as set forth in claim 5, wherein the roll pin has a circumferential side wall and a longitudinal gap interrupting the longitudinal side wall, the longitudinal gap facing radially away from a longitudinal axis of the roll pin in a direction in which the axis of rotation of the drive shaft extends.

8. A non-rising stem gate valve as set forth in claim 1, wherein the race track has a width extending radially with respect to the axis of rotation, and the race track support body has an intermediate section spaced axially from the race track, the intermediate section having a thickness extending radially with respect to the axis of rotation, the thickness of the race track support body being at least as great as the width of the race track.

9. A non-rising stem gate valve as set forth in claim 8, wherein said thickness is greater than said width.

10. A non-rising stem gate valve as set forth in claim 9, wherein the race track and the race track support body are formed of the same piece of material.

11. A non-rising stem gate valve as set forth in claim 8, wherein said intermediate section has an outer surface extending around the axis of rotation, said outer surface being radially outboard of the race track.

12. A non-rising stem gate valve as set forth in claim 1, wherein the drive shaft comprises a continuous piece of material extending between and defining said first and second threaded sections.

13. A non-rising stem gate valve as set forth in claim 1, wherein the bearing assembly further comprises a bearing housing and a gasket, the first race located at least partially in the bearing housing, the race track support body carrying the gasket, the gasket forming a seal with the bearing housing.

14. A non-rising stem gate valve as set forth in claim 13, wherein the race track support body comprises an annular recess in which the gasket is received.

15. A non-rising stem gate valve as set forth in claim 13, wherein the gasket comprises an O-ring.

16. A non-rising stem gate valve as set forth in claim 13, wherein the race track and the race track support body are formed of the same piece of material.

17. A non-rising stem gate valve as set forth in claim 1, wherein the first race is located between the follower and the valve port, and the race track faces toward the follower.

18. A non-rising stem gate valve as set forth in claim 1, wherein the follower is configured to move toward the first race as the gate is moved toward the closed position.

19. A non-rising stem gate valve as set forth in claim 1, wherein the first threaded section of the drive shaft has a first thread type, and the second threaded section of the drive shaft has a second thread type different from the first thread type.

20. A container for holding and/or transporting material, the container comprising:
   a container body defining an interior configured to hold the material; and
   a non-rising stem gate valve as set forth in claim 1, the valve supported by the container body and arranged to permit access into the interior of the container body through the valve when the gate is in the open position.

\* \* \* \* \*